United States Patent
Jiang

(10) Patent No.: US 8,179,913 B2
(45) Date of Patent: May 15, 2012

(54) METHOD AND APPARATUS OF HANDLING VARIABLE OF RLC RESET PROCEDURE DURING RECEIVER-SIDE-ONLY RE-ESTABLISHMENT IN WIRELESS COMMUNICATIONS SYSTEM

(75) Inventor: Sam Shiaw-Shiang Jiang, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 458 days.

(21) Appl. No.: 11/797,300

(22) Filed: May 2, 2007

(65) Prior Publication Data
US 2007/0258489 A1 Nov. 8, 2007

Related U.S. Application Data

(60) Provisional application No. 60/746,360, filed on May 3, 2006.

(51) Int. Cl.
*H04B 7/00* (2006.01)
(52) U.S. Cl. ......... 370/453; 370/503; 455/502; 714/749
(58) Field of Classification Search .................. 370/328, 370/329, 338–349, 449, 913, 453, 282; 714/746–750; 455/502
See application file for complete search history.

(56) References Cited

U.S. PATENT DOCUMENTS

| | | | |
|---|---|---|---|
| 6,473,399 B1 * | 10/2002 | Johansson et al. | 370/229 |
| 6,690,650 B1 * | 2/2004 | Stener | 370/241 |
| 6,697,331 B1 * | 2/2004 | Riihinen et al. | 370/236 |
| 6,862,450 B2 * | 3/2005 | Mikola et al. | 455/438 |
| 6,947,394 B1 * | 9/2005 | Johansson et al. | 370/282 |
| 6,987,981 B2 * | 1/2006 | Kuo | 455/502 |
| 7,242,670 B2 * | 7/2007 | Yi et al. | 370/252 |
| 7,580,385 B2 * | 8/2009 | Bosch et al. | 370/328 |
| 7,821,975 B2 * | 10/2010 | Burbidge et al. | 370/310 |
| 2003/0236905 A1 * | 12/2003 | Choi et al. | 709/231 |
| 2004/0032851 A1 | 2/2004 | Wu | |
| 2004/0153896 A1 * | 8/2004 | Jang | 714/701 |
| 2004/0203623 A1 | 10/2004 | Wu | |

FOREIGN PATENT DOCUMENTS

| | | | |
|---|---|---|---|
| EP | 1311081 A2 | 5/2003 | |
| EP | 1465369 A1 | 10/2004 | |
| EP | 1311081 A3 | 8/2006 | |
| EP | 1777865 A2 * | 4/2007 | |
| JP | 2003224618 | 8/2003 | |
| KR | 20030004966 | 1/2003 | |

OTHER PUBLICATIONS

RAN WG2 Meeting #53, Retrieved from the Internet:http:/www.3gpp.org/ftp/tsg_ran/WG2_RL2/TSGR2_53/Documents, pp. CR 1-8 (XP-002457809).
3GPP TS 25.322 V6.7.0 (Mar. 2006), Radio Link Control (RLC) protocol specification (Release 6), pp. 1-86.
3GPP TS 25.322 V6.4.0 (Jun. 2005), "Radio Link Control (RLC) protocol specification (Release 6)", P44-45/54-55, Jun. 2005.

* cited by examiner

*Primary Examiner* — Hassan Kizou
*Assistant Examiner* — Roberta A Shand
(74) *Attorney, Agent, or Firm* — Klein, O'Neill & Singh, LLP

(57) ABSTRACT

A method of handling a variable of a Radio Link Control reset procedure during receiver-side-only re-establishment in a wireless communications system includes resetting a reset state variable, used for counting the number of times a RESET protocol data unit is scheduled to be transmitted, during receiver-side-only re-establishment.

4 Claims, 3 Drawing Sheets

METHOD AND APPARATUS OF HANDLING VARIABLE OF RLC RESET PROCEDURE DURING RECEIVER-SIDE-ONLY RE-ESTABLISHMENT IN WIRELESS COMMUNICATIONS SYSTEM

CROSS REFERENCE TO RELATED APPLICATIONS

This application claims the benefit of U.S. Provisional Application No. 60/746,360, filed on May 3, 2006 and entitled "Method and Apparatus of RLC Reset after Receiver-Side-only Re-establishment in a Wireless Communications System," the contents of which are incorporated herein by reference.

BACKGROUND OF THE INVENTION

1. Field of the Invention

The present invention relates to a method and related apparatus of handling a variable of a Radio Link Control (RLC) reset procedure during receiver-side-only re-establishment in a wireless communications system, and more particularly to a method and related apparatus for keeping chances for retransmission of RESET PDU (protocol data unit) after receiver-side-only re-establishment.

2. Description of the Prior Art

The third generation (3G) mobile communications system has adopted a Wideband Code Division Multiple Access (WCDMA) wireless air interface access method for a cellular network. WCDMA can provide high frequency spectrum utilization, universal coverage, and high quality, high speed multimedia data transmission. The WCDMA method also meets all kinds of QoS requirements simultaneously, providing diverse flexible two-way transmission services and better communication quality to reduce transmission interruption rates.

Taking a signal communications protocol standard set forth by the 3rd Generation Partnership Project (3GPP) as an example, targeting the Access Stratum (AS), the 3G mobile communications system defines various protocol stacks, such as Radio Resource Control (RRC), Radio Link Control (RLC), Media Access Control (MAC), Packet Data Convergence Protocol (PDCP), and Broadcast/Multicast Control (BMC). In addition, the 3G mobile communications system also provides different levels of transmission quality, and can operate in different corresponding modes according to different transmission quality requirements, such as: Transparent Mode (TM), Unacknowledged Mode (UM), and Acknowledged Mode (AM). TM is appropriate for use in services with high requirements for real-time transmission, UM is appropriate for use in services with requirements for real-time transmission and packet sequencing, and AM is appropriate for use in services with low requirements for real-time transmission, but high requirements for data accuracy.

In AM, the RLC layer combines a transmitter side and a receiver side. The transmitter side and the receiver side each process transmission and reception through the RLC layer, and both sides can share system resources. In some circumstances, the RLC layer must be re-established, e.g. when changing a PDU size. The prior art re-establishes the RLC layer by re-establishing the transmitter side or the receiver side.

Directed at operations corresponding to re-establishing the RLC layer, a communications protocol specification established by the 3GPP (3GPP TS 25.322 V6.7.0 (2006-03), "Radio Link Control (RLC) protocol specification (Release 6)") is already described in detail. According to section 9.7.7 of the aforementioned RLC protocol specification, the prior art has disclosed operations of specified control PDUs and Timers when only the receiver side is re-established. However, the prior art does not teach how to handle a reset state variable, VT(RST).

According to the aforementioned RLC protocol specification, the reset state variable VT(RST) is used to count the number of times a RESET PDU is scheduled to be transmitted before a reset procedure is completed. The sender shall increment VT(RST) by 1 when a STATUS PDU or a piggybacked STATUS PDU reported from the receiver includes "erroneous Sequence Number". If the reset state variable VT(RST) equals its maximum value, the value of the protocol parameter MaxRST, the sender shall terminate the ongoing RLC reset procedure, stop the timer Timer_RST if it was started, and indicate unrecoverable error to the upper layer. Otherwise, if the reset state variable VT(RST) is smaller than the protocol parameter MaxRST, the sender shall output a RESET PDU to start RLC reset procedure. In addition, the initial value of the reset state variable VT(RST) is 0. The reset state variable VT(RST) is only reset upon the reception of a RESET ACK PDU, i.e. VT(RST) is not reset by the RLC reset procedure.

In the prior art, when only the receiver side of an RLC entity is re-established, the current RLC reset procedure is aborted, and then a new RLC reset procedure is started. Under such circumstance, the status variable VT(RST) of the aborted RLC reset procedure is not reset. If the status variable VT(RST) is near the maximum allowed value, say MaxRST-1, then there is only one chance for the sender to transmit the RESET PDU and to receive the RESET ACK PDU. If either one of them gets lost during radio transmission, the reset state variable VT(RST) is not reset but incremented by 1, meaning that VT(RST)=MaxRST. As a result, the sender terminates the ongoing RLC reset procedure, and indicates unrecoverable error to the upper layer. The RLC entity will be re-established again unnecessarily.

SUMMARY OF THE INVENTION

According to the present invention, a method of handling a variable of a Radio Link Control reset procedure during receiver-side-only re-establishment in a wireless communications system comprises resetting a reset state variable, used for counting the number of times a RESET protocol data unit is scheduled to be transmitted, during receiver-side-only re-establishment.

According to the present invention, a communications device utilized in a wireless communications system for accurately handling a variable of a Radio Link Control reset procedure during receiver-side-only re-establishment comprises a control circuit for realizing functions of the communications device, a processor installed in the control circuit for executing a program code to operate the control circuit, and a memory coupled to the processor for storing the program code. The program code comprises resetting a reset state variable, used for counting the number of times a RESET protocol data unit is scheduled to be transmitted, during receiver-side-only re-establishment.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
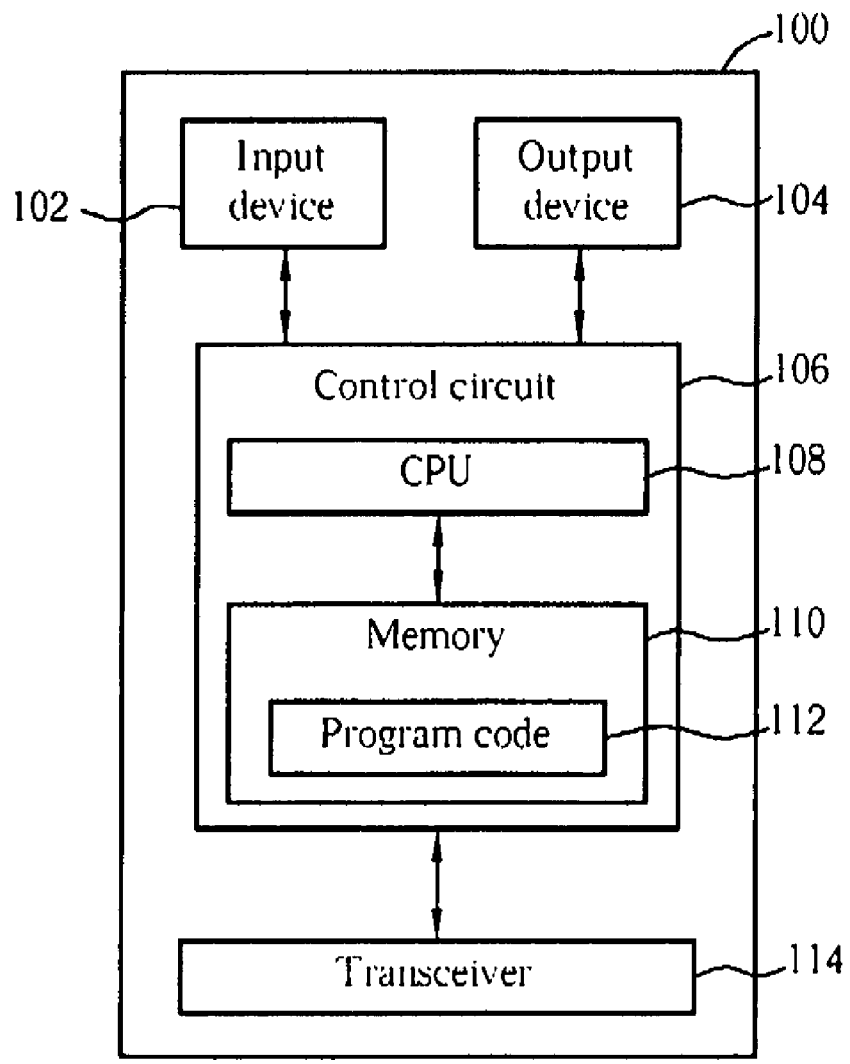
FIG. 1 is a function block diagram of a wireless communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 2:
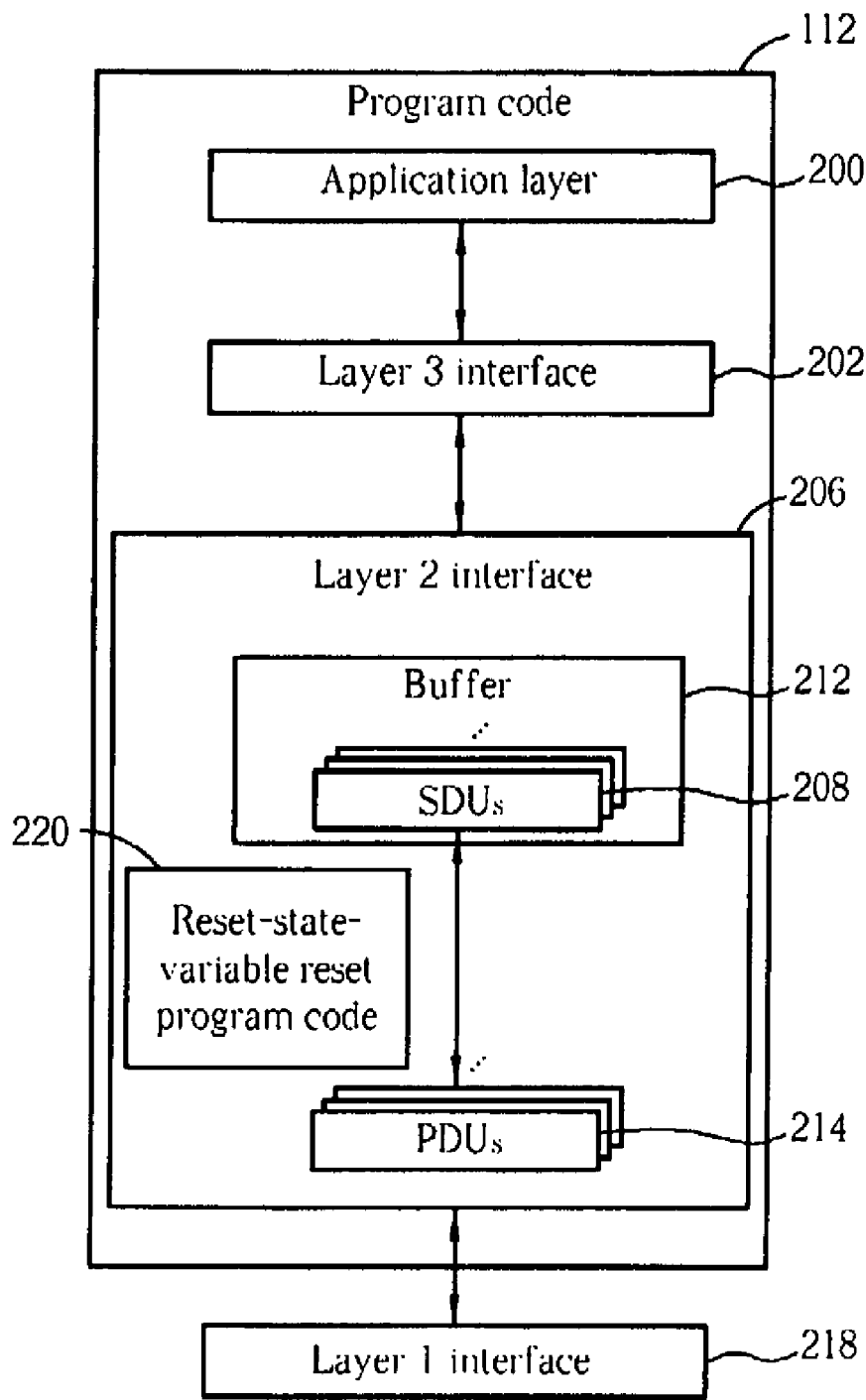
FIG. 2 is a diagram of program code of FIG. 1.

Please continue to refer to FIG. 2. FIG. 2 is a diagram of the program code 112 shown in FIG. 1. The program code 112 comprises an application layer 200, a Layer 3 interface 202, and a Layer 2 interface 206, and is coupled to a Layer 1 interface 218. When a signal is transmitted, the Layer 2 interface 206 forms a plurality of SDUs 208 according to data submitted by the Layer 3 interface 202, and stores the plurality of SDUs 208 in a buffer 212. Then, based on the SDUs 208 stored in the buffer 212, the Layer 2 interface 206 generates a plurality of PDUs 214, and sends the plurality of PDUs 214 to a destination terminal through the Layer 1 interface 218. In contrast, when a wireless signal is received, the signal is received through the Layer 1 interface 218, then delivered as PDUs 214 to the Layer 2 interface 206. The Layer 2 interface 206 restores the PDUs 214 to SDUs 208 and stores the SDUs 208 in the buffer 212. Last, the Layer 2 interface 206 delivers the SDUs 208 stored in the buffer 212 to the Layer 3 interface 202.

When the communications device 100 operates in AM, the Layer 2 interface 206 can count the number of times a RESET PDU is scheduled to be transmitted with the reset state variable VT(RST), so as to prevent waste of wireless resources. In such situation, the embodiment of the present invention provides a reset-state-variable reset program code 220 to timely reset the reset state variable VT(RST), to enhance system efficiency, and to prevent unnecessary re-establishment of the RLC entity.

Figure 3:
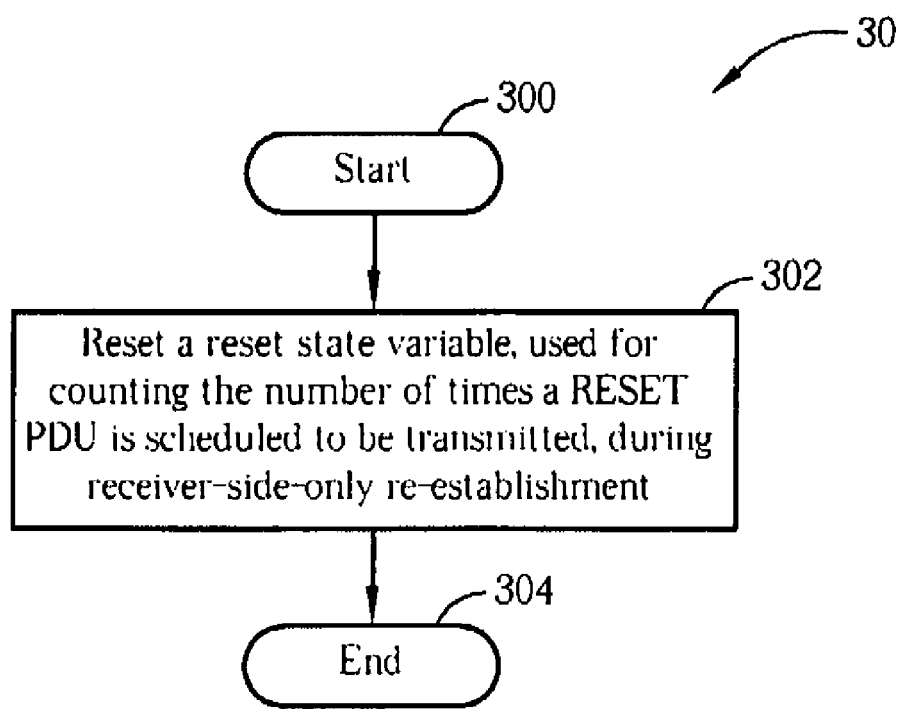
FIG. 3 is a flowchart of a process according to the embodiment of the present invention.

Please refer to FIG. 3, which illustrates a flowchart of a process 30 according to the embodiment of the present invention. The process 30 is utilized for handling a variable of an RLC reset procedure during receiver-side-only re-establishment in a wireless communications system, and can be complied into the reset-state-variable reset program code 220.

The process 30 comprises steps of:
Step 300: Start.
Step 302: Reset a reset state variable, used for counting the number of times a RESET PDU is scheduled to be transmitted, during receiver-side-only re-establishment.
Step 304: End.

According to the process 30, when the RLC entity only re-establishes the receiver side, the embodiment of the present invention resets the reset state variable VT(RST). Therefore, when a new RLC reset procedure starts, the reset state variable VT(RST) starts from 0, and the RESET PDU can be retransmitted as many times as allowed by configuration, such as the protocol parameter MaxRST.

In the prior art, when only the receiver side of an RLC entity is re-established, the status variable VT(RST) is not reset, so that the sender indicates unrecoverable error to the upper layer, and the RLC entity will be re-established again unnecessarily. In comparison, when only the receiver side of an RLC entity is re-established, the embodiment of the present invention resets the status variable VT(RST), so that the sender has chances to retransmit the RESET PDU.

In summary, the present invention can timely reset the reset state variable, so as to maintain transmission efficiency, and decrease transmission time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a variable of a Radio Link Control reset procedure during receiver-side-only re-establishment in a wireless communications system comprising:
   re-establishing only a receiver side of an Radio Link Control (RLC) entity: and
   resetting a reset state variable, used for counting the number of times a RESET protocol data unit (PDU) is scheduled to be transmitted, during the re-establishing of only the receiver side of the RLC entity.

2. The method of claim 1, wherein the wireless communications system operates in Acknowledged Mode.

3. A communications device utilized in a wireless communications system for accurately handling a variable of a Radio Link Control reset procedure during receiver-side-only re-establishment comprising:
   a control circuit for realizing functions of the communications device:
   a processor installed in the control circuit for executing a program code to operate control circuit: and
   a memory coupled to the processor for storing the program code:
   wherein the program code comprises:
      re-establishing only a receiver side of an Radio Link Control (RLC) entity: and
      resetting a reset state variable, used for counting the number of times a RESET protocol data unit (PDU) is scheduled to be transmitted, during the re-establishing of only the receiver side of the RLC entity.

4. The communications device of claim 1, wherein the wireless communications system operates in Acknowledged Mode.

\* \* \* \* \*